United States Patent [19]

Pordy

[11] Patent Number: 5,480,670
[45] Date of Patent: *Jan. 2, 1996

[54] LOW FAT, LOW CHOLESTEROL, AND LOW CALORIE DAIRY LIGHTENER

[75] Inventor: William T. Pordy, New York, N.Y.

[73] Assignee: Carberry Corporation, New York, N.Y.

[ * ] Notice: The term of this patent shall not extend beyond the expiration date of Pat. No. 5,366,751.

[21] Appl. No.: 342,917

[22] Filed: Nov. 21, 1994

Related U.S. Application Data

[63] Continuation-in-part of Ser. No. 890,803, Jun. 1, 1992, Pat. No. 5,366,751.

[51] Int. Cl.$^6$ ............................................. A23C 11/02
[52] U.S. Cl. ...................... 426/580; 426/585; 426/586; 426/588; 426/611; 426/804
[58] Field of Search ................................. 426/580, 585, 426/586, 588, 611, 804

[56] References Cited

U.S. PATENT DOCUMENTS 5,366,751  11/1994  Pordy ........................................ 426/580

Primary Examiner—Helen Pratt

[57] ABSTRACT

A liquid coffee lightener is disclosed which consists essentially of skim milk having approximately 8.5% milk solids by weight and "B" grams butterfat by weight. Additional milk solids in an amount of 2–12% by weight, are added to the milk. An all natural fat substitute is added in an amount of 0.3–10% by weight. The coffee lightener has total solids content within the range of 11–28% by weight and total fat and fat mimetic content to simulate the taste, body, appearance, mouthfeel and organoleptic properties of conventional dairy creamers while being lower substantially in total fat, saturated fat, and calorie content of and not exceeding the cholesterol content of conventional creamers. The butterfat content "B" of the milk and the volume "V" are related as follows:

$$V \times B \leq 50.$$

As preferred, formulation includes a fat substitute made from whey protein 2% by weight and a milk solid preparation 3.5% by weight. The lightener, which can be packaged conventionally or aseptically, may further contain stabilizers and/or emulsifiers, such as K carrageenan polysaccharides 0.025–0.060% by weight. Optionally, flavorings may be added to the lightener which can produce instant flavored beverages by simple addition of the product to those conventionally brewed.

19 Claims, No Drawings

LOW FAT, LOW CHOLESTEROL, AND LOW CALORIE DAIRY LIGHTENER

CROSS REFERENCE TO RELATED APPLICATION

This application is a Continuation-In-Part of U.S. Ser. No. 07/890,803; Filed Jun. 1, 1992, which has issued as U.S. Pat. No. 5,366,751.

BACKGROUND OF THE INVENTION

This invention generally relates to dairy creamers or coffee lighteners, and more particularly to a coffee creamer or lightener which has improved nutritional value and enhanced sensory appeal.

More coffee is purchased and consumed in the United States than in any other country of the world. However, coffee is consumed heavily in many other countries, making coffee one of the most popular beverages and second only to oil as a global commodity. Traditionally, coffee has been used with coffee creamers or lighteners to lighten the color of the coffee and to neutralize acids in the coffee, thereby producing a smoother, milder drink; and, as of 1991, 54% of those Americans who drink coffee drink it lightened. Most frequently, the public has used fluid, dairy-based coffee creamers or lighteners, such as milk in the home and "Half & Half" in portioned or controlled servings outside of the home. While "Half & Half" has been a popular creamer, it is a fluid milk product that has a butterfat content of not less than 10.5% by weight, to provide a creamer containing approximately 19% solids by weight. Although "Half & Half" provides the desired lightening or whitening of the coffee, the product has nutritional shortcomings, being high in cholesterol and saturated fats and typically containing approximately 22 calories per serving. A wide range of lighteners have been developed to compete with milk and "Half & Half," generally falling into three product categories. At the low end, there are powdered non-dairy creamers. The "Half & Half" products together with liquid, refrigerated, dairy creamers fill the high end, while liquid non-dairy creamers fill the middle category.

Powdered non-dairy creamers have the advantage that they are low in price per serving and are typically one-year shelf stable, so that they can be used anywhere, in offices, outdoor activities and anywhere else where there is no refrigeration. The visual appeal of non-dairy powders when mixed into it are generally acceptable, although the taste and the mouthfeel of the product is typically well below average. Nutritionally, powdered non-dairy creamers have little or no cholesterol, although they contain fats (some with a fat content per serving in excess of "Half & Half") and varying caloric values, chemical additives and derived constituents. Largely, these non-dairy powders contain sodium caseinate, a milk derivative.

Liquid non-dairy creamers are somewhat more costly per serving than the powdered creamers and typically have a 45–90 day refrigerated or frozen shelf life. The liquid non-dairy creamers are typically more appealing in terms of taste and mouthfeel than the powder counterparts, although they still fall far short of the dairy creamers, and tend to have a higher fat content. Both the powder and the liquid non-dairy creamers contain non-natural additives. While liquid non-dairy creamers usually contain no cholesterol, they may contain at least the fat of "Half & Half" and up to 45 calories per serving. The liquid non-dairy creamer product, therefore, appeals narrowly to people who are allergic to dairy products but prefer a creamier taste to the powders. While "Half & Half" is generally more expensive than the non-dairy creamers, it is an "all natural dairy product" which, in and of itself, has appeal to a large segment of the consumer market.

In order to retain the sensory appeal of "Half & Half" and try to enhance its nutritional and health values, numerous creamers have been introduced into the marketplace, many of which are of interest because they enhance one or more of the properties of the creamers, such as ease of handling and (unrefrigerated) shelf stability. One important driving force behind the development of many of these creamers has been to simulate a low cost fluid dairy creamer which has little or no butterfat and is low in cholesterol. However, as suggested, regardless of their physical form, non-dairy coffee lighteners typically contain at least as much fat as "Half & Half," this fat being introduced through the same essential ingredient, namely hydrogenated vegetable fats or oils thereof. Therefore, notwithstanding that non-dairy coffee lighteners contain no cholesterol, their content of highly saturated fats presents the same sort of dietary dilemma as the high cholesterol levels of high butterfat creamers, such as "Half & Half."

By way of a few specific examples, a low-fat dairy coffee lightener is disclosed in U.S. Pat. No. 4,689,245 which is made from decreamed milk ultrafiltration retentate. A whitening enhancement is provided in the form of riboflavin and beta carotene. The composition is described as usually being in powdered form, high in protein, low in fat. The aforementioned patent has as its primary objective to provide a low-fat dairy coffee lightener with qualities substantially equal to a non-dairy coffee creamer. The disclosed lightener is also intended to provide substantially the same coloring in coffee as the non-dairy creamers. While the product is low in fat, with 0.5% or less of fat in the dairy coffee lightener by weight, the very low fat levels would appear to decrease the mouthfeel of the popular dairy creamers, such as "Half & Half." None of the ingredients mentioned in the patent would appear to provide an adequate substitute for the levels in fat required to provide the desired mouthfeel of the more popular creamers.

U.S. Pat. No. 4,784,865 is for a low-fat coffee lightener. The patent discloses a substantially fat and cholesterol free, low calorie, fluid dairy coffee lightener which includes, as its major ingredient, low-fat milk having a butterfat content not exceeding 1.0% by weight and preferably less than about 0.4% by weight and non-fat dry milk solids. The product also includes an emulsifier. The objective of the product is to produce a coffee lightener that has the appearance, taste and mouthfeel of conventional high butterfat containing dairy creamers. The creamer has total solid contents of 18–25% by weight and a calorie content of less than 10 calories per serving. With a total solid content of 18–25% by weight, the product contains the approximately 19% by weight of solids contained in "Half & Half." However, while the total solids content of 18–25% by weight overlaps the levels in "Half & Half," the total butterfat is less than 1% by weight and, therefore, it does not appear that the patented product contains sufficient fat levels to provide the desired mouthfeel or creaminess of the product.

In U.S. Pat. No. 5,024,849 for a liquid coffee lightener, an aqueous emulsion system is disclosed which contains fat or oil, water, carbohydrates, as the essential or the primary ingredients, and a protein hydrolysate to provide a stable emulsion. The hydrolysate provides an effective alternative, both functionally and organoleptically, for the use of sodium caseinate and buffering salts used in conventional liquid coffee lighteners. The liquid coffee lightener disclosed in this patent contains 3–18% vegetable fat by weight, with a preferred level being at 6.8% by weight. The creamer or lightener disclosed is not an all dairy creamer and contains higher levels of fat than is required to provide the desired mouthfeel and other organoleptic properties of "Half & Half" as well as other high end all natural dairy creamers or lighteners.

SUMMARY OF THE INVENTION

It is, therefore, a primary object of the present invention to provide a low-fat, low-cholesterol dairy creamer which maintains the organoleptic properties of "Half & Half" while providing an aesthetical pleasing fluid, dairy coffee lightener having the appearance, taste, body, mouthfeel and whitening ability of high butterfat-containing dairy creamers yet which has a negligible saturated and total fat content, cholesterol content and low calories per serving as compared to either high butterfat or non-dairy creamers. The result is an effective coffee lightener, despite the absence of oils and fats, which is aesthetical pleasing, minimizes the risk of heart disease and is attractive to calorie conscious dieters.

It is another object of the present invention to provide a low-fat, low cholesterol dairy creamer of the type aforementioned which can be optionally aseptically packaged to provide approximately one year shelf stability without refrigeration.

It is still another object of the present invention to provide a low-fat, low cholesterol dairy creamer which is an all natural product, and does not require the use of synthetic preservatives or food constituents.

It is a further object of the invention to provide a dairy creamer as suggested in the previous objects which can be designated as being "fat free" under the National Labeling Education Act (NLEA) regulastions effective May 8, 1994 and which uses milk having a generally broad range of butterfat content.

It is yet another object of the present invention to provide a dairy creamer of the type under discussion which can be priced between the mid category liquid non-dairy creamers and high end "Half & Half" liquid dairy creamers and whose benefits will thus be easily available/obtainable to the coffee-drinking public.

In order to achieve the above objects, as well as others which will become apparent hereafter, the coffee lightener product of the present invention consists essentially of skim milk having approximately 8.5% milk solids by weight and "B" grams of butterfat by weight. Additional milk solids in an amount of 2–12% by weight are added to the milk. An all natural fat substitute is added in an amount of 0.3–10% by weight, the coffee lightener having, in a substantially standard 0.5 oz. serving "V" of approximately 15 mL, total solids content of 11–28% by weight and total fat and fat mimetic content to simulate the taste, body, appearance, mouthfeel and organoleptic properties of conventional dairy creamers while being lower substantially in total fat, saturated fat, and calorie content of and not exceeding the cholesterol content of conventional creamers, and wherein the butterfat content "B" and the volume of the serving "V" are related as follows:

$$V \times B \leq 50.$$

In the presently preferred embodiment of the present invention, the milk is a skim milk having approximately 2% butterfat by weight, the additional milk solids are within the range of 3.5–4% by weight; and the natural fat substitute is within the range of 1.5–2% by weight.

DESCRIPTION OF THE PREFERRED EMBODIMENTS

The present invention relates to a fluid, low butterfat containing coffee lightener dairy product which resembles conventional high butterfat content coffee creamers in appearance, taste and mouthfeel, but which has negligible fat content and a calorie content substantially reduced below that of conventional dairy or non-dairy coffee lighteners. As a result, the coffee lightener of the present invention is low in cholesterol and saturated fats. In addition, it is suitable for inclusion in the diet of persons for whom a reduced intake of fat or calories is necessary or desirable.

In the presently preferred compositions of the coffee lightener, skim milk is used which has a butterfat content of 2% by weight (grams %), and the additional milk solids are provided in a range of 2–12% by weight, and preferably 3.5–4% by weight. The natural fat substitute is provided in the range of 0.3–10% by weight, and preferably 1.5–2.0% by weight.

While the presently preferred embodiment of the present invention includes, as a basic ingredient, skim milk having a butterfat content of 2% by weight, it will be appreciated that milk products having different butterfat contents can be used while still achieving the objects of the present invention. One of the objects of the present invention is to provide a liquid coffee lightener that can be designated as being "fat free" under the National Labeling Education Act ("NLEA"). A regulation promulgated by NLEA effective May 8, 1994, a liquid coffee lightener can be labeled as being "fat free" if it contains no greater than 0.5 grams of fat in a "standard serving" of approximately of one half ounce (approximately 15 mL). While a standard serving is typically is approximately ½ ounce or approximately 15 mL, the sizes of servings do vary slightly in different parts of the country and another common serving size is ⅜ of an ounce. Since the NLEA regulations place a total butterfat content weight limitation on what can be designated as "fat free", it is clear that there is some latitude in the butterfat content of the milk used to produce the coffee lightener in accordance with the present invention. Thus, for example, milk having a maximum of 3.3% weight of butterfat content can be used in a ½ ounce serving while still limiting the amount of total butterfat content to 0.5 grams. However, whole milk, which includes 3.5% by weight butterfat content cannot be used in a half ounce serving, since the total butterfat content would be equal to 0.525 grams. Yet, whole milk with butterfat content as high as 3.57% by weight can be used with a 0.47 oz. or 14 mL serving since, in that case, the total butterfat of the serving would also be 0.5 grams. In connection with ⅜ or 14 mL servings, whole milk can also be used since this would result in only a 0.4 grams butterfat content, and milk having as high as 4.4% weight butterfat content can be used with a ⅜ oz. serving to provide the maximum 0.5 grams of butterfat.

In view of the foregoing, if milk is used as the basic ingredient, and it has "B" grams of butterfat by weight, and is a substantially standard 0.5 oz. serving "V" of approximately 15 mL is used, the butterfat content "B" in the volume of the serving "V" are related as follows: $V \times B \leq 50$. It is clear that the aforementioned relationship defines the size of the serving and the butterfat content of the product to provide less than 0.5 grams of total butterfat so that the product can be labeled "fat free" under the NLEA regulations as indicated.

The specific fat substitute that is used is not critical, although the present invention contemplates the use primarily of a natural dairy fat substitute: an example of such is an all natural ingredient made from whey protein which is blended and prepared to make a creamy, rich product. Whey protein concentrate is available in powder form as "DAIRY-LO"® from Pfizer Incorporated (Food Science Group) of New York, and in liquid and in powder forms as "SIMPLESSE 100"®, from NutraSweet Company of Deerfield, Ill. Thus, skim milk with low butterfat content is the starting point to which a fat substitute, as aforementioned, is added. The purpose of reintroducing a fat substitute to the milk is to produce (physically) a formulation that simulates the fat content of a dairy, all natural creamer, such as "Half & Half" The fat in those creamers serves many functions, including structural stability, opacity, enhancers of the flavor, provides proper mouth coating and mouthfeel, the texture being perceived as creaminess, smoothness, thickness and viscosity.

It will be appreciated that the aforementioned roles or functions of fat result, for the most part, from the shape of the particles by replicating the sizes and shapes of the fat particles, "SIMPLESSE 100" or other fat substitutes can be used along with other widely used food ingredients to create a fat replacement system that delivers its food excellent quality at extremely low fat levels. Thus, individual foods are perceived in accordance with the sizes of the particles and shapes. Particles smaller than 0.1 micron in size are generally perceived as watery, while particles larger than 3.0 microns are generally perceived as powdery or gritty. In contrast, particles in that range and size from 0.1 to 3.0 microns, such as those present in the contemplated fat substitutes are perceived by the tongue as creamy. "SIMPLESSE 100,"® being a protein derivative, has a unique form and shape. These countless particles, simulating fat micelles tend to roll easily over one another, delivering the texture and appearance of high fat foods. In other words, this class of fat substitutes is formed typically into tiny spheres which are so sized that the mouth cannot perceive them individually, rather, they roll over one another, creating a creamy texture-just like fat.

Another possible natural fat substitute is produced by Quest International BioProducts Group of Sarasota, Fla. and sold as "ENRICH 301."® This substitute is a blend of cultured non-fat dry milk. The hydrocolloid resulting from the culturing process stabilizes and emulsifies the food products in which it is used while maintaining an all natural ingredient composition. When "ENRICH 301"® is used, it may be used in amounts of 1.5– 2.5% by weight. This substitute has the additional advantage that it eliminates the need for gums and emulsifiers, thus providing an easy to read all natural ingredient declaration. This fat substitute provides a creamy texture and mouthfeel. It is formed of cultured dairy solids, including whey, citric acid, lactic acid starter culture, so that it is a dairy product, and is approved to be so labelled ("Cultured Grade 'A' dairy solids").

Another example of an all natural fat substitute is a product sold under the brand "SLENDID"™ fat replacer sold by Hercules Incorporated of Wilmington, Del. "SLENDID" fat replacer is pectin derived from citrus peel. Pectin is a hydrocolloid obtained by aqueous extraction of appropriate plant material such as citrus peel and apples. This fat substitute, representing a second class of fat substitutes, is a thickener and gelling agent and is designed to provide a uniform gel strength. The major performance characteristics of "SLENDID" fat replacer is that it can be used to replace the texture and mouthfeel of fat, providing a creamy, fatlike texture that is easily changed to suit the requirement of various types of products. It has a neutral taste and, therefore, provides an excellent base for delicate flavors. It can be used in many products that ordinarily contain emulsified fats. Being a natural ingredient, pectin is a carbohydrate that occurs naturally in all fruits and vegetables and, as indicated, pectin is derived from peels of citrus. When fat is emulsified, it is sheared into small particles. The size of the fat globules vary depending on the size of the food product and the processing conditions. When "SLENDID" is used to replace fat in a product, a gel made from "SLENDID" is sheared into small particles which have the physical and organoleptic, or sensory, characteristics of the fat globules in the emulsified fats. The sheared gel particles, which are prepared using similar processing conditions, would be of similar particle size range. In addition, the "SLENDID" gel particles are soft and deformable, the same way fat particles are. "SLENDID" fat replacer usually constitutes less than 5% of the final product and, in the instant application, it can constitute 1% or less.

Experts seem to agree that there is as of yet, no perfect fat substitute. That fact forces product developers to continue making tradeoffs in product quality. While "DAIRY-LO" ® is the presently preferred all natural fat substitute for this invention, the invention is not limited to this substitute, as suggested above. Also, the use of other classes of natural fat substitutes that may be developed in the future is contemplated, as long as they provide the necessary organoleptic properties of butterfat and the health and nutritional properties of the invention. For the purpose of this application, a natural fat substitute is defined as a protein, carbohydrate or fat or derivative or modification thereof with organoleptic but not all of the biochemical fat mimetic properties.

While the fat substitutes, which include particle sizes of about 1–3 microns in diameter provide body and viscosity, they also aid in the whitening properties of the final product, whitening being primarily the result of light reflected from the surface of the emulsified fat globules. However, with the generally low total fat levels in the liquid coffee lighteners in accordance with the present invention, it is contemplated that additional milk solids will be added to the skim milk based composition to lighten truly and to enhance greatly the whiteness of the creamer to a color which more closely simulates the color of coffee when "Half & Half" is added. Additional milk solids may be added in an amount of 2–12% by weight to the skim milk. A more preferred range is 3.5–4.0% by weight of additional milk solids, with a presently preferred 4.0% by weight being used. As with the natural fat substitutes, the specific additional milk solids used is not critical for the present invention. However, it is preferred that a natural and all dairy product be used for this purpose. One suitable example of such a milk solid preparation is "6082 Alaco PAL" (RDC 262) from New Zealand Milk Products, Santa Rosa, Calif. Another example of a suitable milk solid additive is a product sold under the brand "ECCO 901" sold by Erie Foods International, Inc. of Rochelle, Ill. This product consists of sweet dairy whey and calcium caseinate. It is a highly soluble milk protein which is more easily dispersed in water than standard blends. "ECCO 901" is subjected to low processing temperature resulting in a nutritional and nutritious product approximating the chemical and nutritional properties of non-fat dry milk. This product is creamy to white in color and has a bland flavor. Erie Foods also sells other non-fat milk replacers. One is "ECCO 930" which is a whey/sodium caseinate and "ECCO 948" which is another whey/calcium caseinate. However, "ECCO 901" provides good suspension qualities, better whitening than the sodium caseinates and it has been found through marketing and sensory analyses to provide less caseinate taste than the sodium caseinates.

Emulsifiers may be incorporated to maintain the product suspension, particularly important if the product embodying the invention is to be packed for extended shelf life/shelf stability. Stabilizers, typically improve the colloidal solubility of the proteins used in the formulation and aid in controlling body and viscosity of the product. Emulsifiers that are used commonly with dairy products include the mono- and di-glycerides. However, other commonly-used commercially available dairy emulsifiers and stabilizers may also be used, either alone or in combination, and are the preferred embodiments of the invention.

When the liquid coffee lightener in accordance with the present invention is packaged conventionally, in which case it should be used within 7 to 10 days, stabilizers and emulsifiers may be omitted. However, when packed aseptically for long shelf stability approaching one year, stabilizers and emulsifiers should be used.

One example of an emulsifier that can be used are polysaccharides 0.025–0.060% by weight. In accordance with the presently preferred composition, a sub-class of these polysaccharides: the kappa (K) carrageenans are used in levels of 250 parts per million (ppm). A range of such emulsifiers is sold by FMC Corporation, Marine Colloids Division, of Philadelphia, Pa. Carrageenans are produced from different species of seaweeds and are linear polysaccharides. The properties of all these polysaccharides are that they are soluble in water, and kappa carrageenans when added to the product cause the formation of a strong, rigid gel: at certain locations on the surface of casein micelles there are very large concentrations of positive charges which react strongly with the negative charges of the carrageenans. This reaction increases the product "strength" about 10 times. One specific carrageenan produced by FMC: "SEAKEM 611"® is useful in particular for emulsifying and stabilizing the dairy creamer and is suitable in general for UHT packages with a long shelf life at the suggested usage level of 0.025%–0.060% based on weight of the final product. The carrageenan emulsifiers can be used: to enhance "shelf life" in products exhibiting phase separation, such as oil and water, to provide a complex scaffolding for nutritional and organoleptic product balance and to prevent feathering, separation, settling and gelation.

The use of carrageenans as well as guar gum in aseptically packaged milk is discussed, for example, in U.S. Pat. No. 4,851,243 for a calcium fortified aseptically packaged milk. The aforementioned patent discusses the use of the kappa carrageenans, its properties and, its activity as well as preferred ranges of percentages of the carrageenan gums used, including "SEAKEM 315."®

The all natural dairy creamer in accordance with the present invention can be conventionally processed and packaged, using well-known processes including pasteurization and homogenization. However, in accordance with a presently preferred method, the creamer or lightener in accordance with the present invention is to exposed to ultra-high temperature (UHT) with concomitant homogenization and thereupon packaged aseptically. Aseptic packaging systems have been developed and accepted by the U.S. Food and Drug Administration to provide packaging of sterile dairy products intended for long-term storage without refrigeration. The use of UHT produces a product that is free of spoilage organisms by heating the fluid dairy product to a temperature that is high enough to kill spore-forming organisms and produce a "commercially sterile" product. The application of UHT to food dairy products is discussed in U.S. Pat. Nos. 4,888,194 for shelf-stable aseptic dairy product and 4,980,182 for beverages containing a beverage base and milk protein. Typically, UHT treatment may be carried out, for example, at 265° F.–300° F. for from 2 to 30 seconds; either a direct or indirect (plate or tubular) heat exchange system may be used, the duration of treatment pends the particular process.

When UHT skim-milk or other dairy products are treated to destroy contaminating bacteria and produce "commercial sterility," it is almost always packaged aseptically so as not to permit recontamination, and, in this manner, a sterile shelf stable product is prepared. The duration of shelf stability is related to the moisture and oxygen barriers of the packaging material with shelf lives of one year or more having been obtained already commercially. While both direct and indirect heating systems give products with similar shelf lives (and are, therefore, effective equally in their bacteriocidal action), it is claimed by some that the organoleptic properties of the products from direct UHT processing are superior. However, the entire area of flavor and manufacturing is so complex that it is difficult to make a quantitative judgment on the merits of these two systems, and in terms of this invention an indirect tubular system is preferred because of: uniformity of heat exchange, decreased product fouling and flexibility in homogenization. It is for the reasons mentioned above that when the product is intended for extended shelf life, it should be UHT processed and packaged aseptically.

While plastic cups, bags, maxi and mini bags, glass and plastic bottles and heat-sealed "combi-cans" are all qualified for aseptic packaging, and any of the aforementioned may be used for packaging, the dairy creamer in accordance with the present invention, the most widely used container for the aseptically packaged product are the mini-plastics cups or cans which provide, as example, individual ⅜ fluid ounce (11.25 cc.) servings as used in the service food industry and, to a lesser extent, by consumers for home use. Such mini-containers or cans, as well as larger containers can be packaged aseptically by different existing equipment. The specific equipment that is used is not critical; however, such machinery in specific and the process in general must be government accepted. Within the United States, the Food and Drug Administration has accepted two such aseptic filling and sealing machines: the one manufactured by Hassia Verpackungsmaschinen GmbH of Hessen, Germany (Machine Model TAS ²⁴/₂₈) is preferred for this invention because of its use of super-heated steam for sterilization. It has been found that sterilization using super-heated steam with overpressure provides excellent sterilization and provides for commercial sterility with regard to fungi, yeasts, vegetative bacteria and sporulating bacteria.

The all natural dairy creamer or lightener in accordance with the present invention may also be combined with any of a number of (preferably natural) flavors as vanilla nut, Irish cream, amaretto and cinnamon. Once such flavored product is packaged aseptically, it can be stored for extended periods of time without refrigeration before opening. With such flavored product, consumers need only brew their favorite regular coffees, choose a packet of the flavored creamer and pour it in instead of the usual non-dairy creamer, milk, or "Half & Half." The cost of flavoring the creamer compares very favorably with the normally more expensive flavored coffee beans or coffees mixed with flavoring materials. Therefore, consumers need only purchase and store their favorite regular coffee and select any of the numerous flavors that may be incorporated into the product of the invention.

In summary, the all natural dairy creamer in accordance with the present invention is superior in terms of its sensory appeal, its price value and its health and nutritional benefits over non-existing creamers or lighteners. Preliminary preparations of samples in accordance with the present invention have been found to have a taste which is preferred over "Half & Half" and a mouthfeel which is smoother than "Half & Half": 100% preference (n=7) with professional beverage analysts and 87% preference (n=84) with the general public. The visual appeal of the lightened coffee is superior to that of whole milk. The product in accordance with the present invention can be priced comparably to non-dairy creamers and it would also be, therefore, approximately 70% of the cost of "Half & Half." However, if packed aseptically, the product would not require refrigeration and would have up to one year shelf stability. Of primary importance, however, the all natural dairy creamer or lightener in accordance with the present invention is an all dairy product which can be labelled as having no cholesterol, or fat per ⅜ fluid ounce (11.25 cc.) serving and contains only 8 calories. The product of the present invention has a shelf life similar to that of powders, although it is far more superior in its sensory appeal and nutrition. As noted, although it has superior organoleptic and nutritional properties, it is lower in cost than "Half & Half" and other high end coffee lighteners. Too, the invention is not limited to use as an adjunct to coffee but also is appropriate for use with other beverages such as tea. The formation of this invention can also be used advantageously in liquid and power forms as a low fat organoleptically favorable ingredient in cream sauces, soups and sauces.

While the foregoing description of the detailed embodiments of the present invention have been set forth, it will be understood by those skilled in the art that considerable variations may be made in such detail without departing from the spirit of the invention.

I claim:

1. A liquid coffee lightener which consists essentially of milk having approximately 8.5% milk solids by weight and 1–3.57% butterfat by weight; 2–12% by weight of additional milk solids added to said skim milk; and a natural fat substitute 03.3–10% by weight, said coffee lightener having total solids content within the range of 11–28% by weight and total fat and fat mimetic content to simulate the taste, body, appearance, mouthfeel and organoleptic properties of Half & Half while being substantially lower in total fat, saturated fat, and calorie content of and not exceeding the cholesterol content of conventional creamers.

2. A liquid coffee lightener as defined in claim 1, wherein said milk is skim milk which has a butterfat content of 2% by weight.

3. A liquid coffee lightener as defined in claim 1, wherein said milk solids are provided in the range of 3.5–4.0% by weight.

4. A liquid coffee lightener as defined in claim 3, wherein said milk solids are 4% by weight.

5. A liquid coffee lightener as defined in claim 1, wherein said natural fat substitute is within the range of 1.5–2.0% by weight.

6. A liquid coffee lightener as defined in claim 1, wherein said natural fat substitute is a protein derivative.

7. A liquid coffee lightener as defined in claim 1, wherein said natural fat substitute is made from whey protein.

8. A liquid coffee lightener as defined in claim 1, wherein said natural fat substitute is formed of cultured dairy solids.

9. A liquid coffee lightener as defined in claim 1, wherein said additional milk solids comprises soluble milk proteins.

10. A liquid coffee lightener as defined in claim 9, wherein said milk proteins include sweet dairy whey and calcium caseinate.

11. A liquid coffee lightener as defined in claim 1, wherein the lightener further contains stabilizers and emulsifiers.

12. A liquid coffee lightener as defined in claim 11, wherein said emulsifier comprises polysaccharides 0.025–0.060% by weight.

13. A liquid coffee lightener as defined in claim 12, wherein said polysaccharides comprise K carrageenans.

14. A liquid coffee lightener as defined in claim 1, wherein the coffee lightener is an all natural dairy product.

15. A liquid coffee lightener as defined in claim 1, wherein the coffee lightener is UHT treated at 265–300° F. for several seconds.

16. A liquid coffee lightener as defined in claim 1, which is packed aseptically.

17. A liquid coffee lightener as defined in claim 1, wherein the coffee lightener is packaged in servings within the range of approximately 11–15 mL.

18. A liquid coffee lightener as defined in claim 1, further comprising a flavoring.

19. A fat free liquid coffee lightener which consists essentially of milk having approximately 8.5% milk solids by weight and "B" grams of butterfat by weight; 2–12% by weight of additional milk solids added to said milk; and an all natural fat substitute 0.3–10% by weight, said coffee lightener having, in a substantially standard 0.5 oz. serving "V" of approximately 15 mL, total solids content within the range of 11–28% weight and total fat and mimetic content to simulate the taste, body, appearance, mouthfeel and organoleptic properties of Half & Half while being substantially lower in total fat, saturated fat, and calorie content of and not exceeding the cholesterol content of conventional creamers, and wherein the butterfat content "B" and the volume of the serving "V" are related as follows:

$$V \times B \leq 50.$$

where V is in mL and B is in grams.

* * * * *